United States Patent

Takase et al.

[11] Patent Number: 5,913,004
[45] Date of Patent: Jun. 15, 1999

[54] OPTICAL GLASS FIBER COATING COMPOSITION

[75] Inventors: Hideaki Takase, Tsukuba; Mitsuhito Suwa, Yokkaichi; Zen Komiya, Tsukuba; Takashi Ukachi, Ushiku, all of Japan

[73] Assignees: DSM N.V., Heerlen, Netherlands; JSR Corporation, Tokyo, Japan

[21] Appl. No.: 08/840,169

[22] Filed: Apr. 14, 1997

Related U.S. Application Data

[63] Continuation of application No. PCT/NL95/00351, Oct. 13, 1995.

[30] Foreign Application Priority Data

Oct. 14, 1994 [JP] Japan ..................... 6-249277

[51] Int. Cl.$^6$ ................ G02B 6/02; G02B 6/16
[52] U.S. Cl. ............... 385/123; 385/145; 427/163.2; 526/301
[58] Field of Search ............... 526/301; 385/123, 385/145; 427/163.2

[56] References Cited

U.S. PATENT DOCUMENTS

| | | | |
|---|---|---|---|
| 4,246,391 | 1/1981 | Watson | 528/49 |
| 4,717,739 | 1/1988 | Chevreux | 526/301 |
| 4,717,740 | 1/1988 | Hung | 526/301 |
| 4,813,875 | 3/1989 | Hare | 526/301 |
| 4,879,402 | 11/1989 | Reiners | 526/301 |
| 4,920,156 | 4/1990 | Koleske | 526/301 |
| 5,183,831 | 2/1993 | Bielat | 526/301 |
| 5,223,565 | 6/1993 | Takayama | 526/301 |
| 5,254,611 | 10/1993 | McDermott | 526/301 |
| 5,278,268 | 1/1994 | Torii | 526/301 |

*Primary Examiner*—Paul R. Michl
*Attorney, Agent, or Firm*—Pillsbury Madison & Sutro LLP

[57] ABSTRACT

Provided is an optical glass fiber coating composition which when coated on an optical glass fiber and suitably cured provides a coating having the combination of properties (i) through (iv):

(i) a stable tensile modulus that is low at room temperature and over a broad range of temperatures below room temperature,
(ii) an adhesion to the optical glass fiber sufficient to prevent structural defects and microbending in the optical glass fiber,
(iii) the capability of being removed by stripping from the optical glass fiber substantially no residue left on the optical glass fiber, and
(iv) which satisfies each of the following inequalities (I) and (II), $$X \leq 0.2 \text{ kg/mm}^2 \quad (I)$$

$$X/Y \geq 1/10 \quad (II)$$

wherein X is the tensile modulus (kg/mm$^2$) measured at 23° C. and Y is the tensile modulus (kg/mm$^2$) measured at −40° C., This coating composition comprises:
(A) a urethane (meth)acrylate formed from,
(a) a diol compound containing at least one structure represented by one of the following formulas (1) and (2),

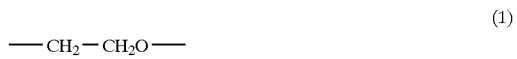

(1)

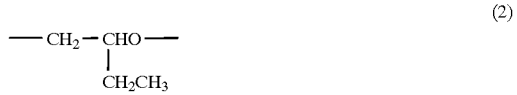

(2)

(b) a compound containing two isocyanate groups, and
(c) a compound containing a (meth)acrylate group and a hydroxy group;
(B) a second (meth)acrylate-containing compound of which the homopolymer has a glass transition temperature of at most about 0° C.; and
(C) a polymerization initiator.

9 Claims, No Drawings

OPTICAL GLASS FIBER COATING COMPOSITION

This is a Continuation of: International Appln. No. PCT/NL95/00351 filed Oct. 13, 1995.

BACKGROUND OF THE INVENTION

1. Field of the Invention

The present invention relates to an optical glass fiber coating composition suitable for use as a primary coating on an optical glass fiber. More particularly this invention relates to an optical glass fiber coating composition which when coated on an optical glass fiber and suitably cured exhibits the combination of properties of low tensile modulus at room temperature, sufficient adhesion to the optical glass fiber to prevent structural defects and microbending in the optical glass fiber, and being strippable from the optical glass fiber while leaving substantially no residue on the optical glass fibers.

2. Description of Related Art

Optical glass fibers are typically provided with one or more coatings of a UV-curable coating composition that when suitably cured protect the optical glass fiber from begin damaged by attack from moisture or mechanical forces. The coating adjacent to the optical glass fiber is known as the primary coating. The primary coating must have a low tensile modulus at room temperature in order to prevent attenuation of the signal transmission caused by structural defects in the interface op the optical glass fibers and the resin, micro bending, and the like.

Because of the high integration of optical cables in recent years and the use of these cables in temperatures below room temperature, the primary coating must have a tensile modulus much lower than that of the primary coatings commonly used for the purpose of reducing attenuation of the signal transmission. Furthermore, to ensure use of the optical glass fibers under low temperature conditions with a minimal attenuation of the signal transmission, the primary coating must have a low and stable tensile modulus over a broad range of temperatures below room temperature.

To join optical glass fibers together or to other components, typically a portion of the coating material must be stripped from optical glass fiber. For this purpose, the primary coating must be strippable form the optical glass fiber while leaving substantially no residue on the optical glass fiber. The primary coating must also have adequate adhesion to the optical glass fiber to prevent structural defects, micro-bending, and the like.

There is a need for an optical glass fiber coating composition which when suitable cured exhibits a low tensile modulus at room temperature that is stable over a broad range of temperatures below room temperature, had adequate adhesion to the optical glass fiber to prevent structural defects, micro-bending, and the like, and yet is strippable from the optical glass fiber while leaving substantially no residue on the optical glass fiber. In WO-A-92/06846 and WO-A-93/21248 compositions are described having urethaneacrylate oligomers based on copolymers from at least ethylene oxide and butylene oxide. Although these optical fiber coating compositions exhibit useful properties, a further improvement is required.

SUMMARY OF THE INVENTION

Accordingly, an objective of the present invention is to provide an optical glass fiber coating composition which when coated on an optical glass fiber and suitably cured has a tensile modulus that is low at room temperature and stable over a broad range of temperatures below room temperature.

Another objective is to provide an optical glass fiber coating composition that when coated on an optical glass fiber and suitably cured exhibits the combination of adequate adhesion to an optical glass fiber and being strippable from the optical glass fiber while leaving substantially no residue on the surface of the optical glass fiber.

These objectives and other objectives are achieved by the following.

The invention provides an optical glass fiber coating composition which when coated on an optical glass fiber and suitably cured provides a coating having the combination of properties (i) through (iv):

(i) a stable tensile modulus that is low at room temperature and over a broad range of temperatures below room temperature, (ii) an adhesion to the optical glass fiber sufficient to prevent structural defects and microbending in the optical glass fiber, (iii) the capability of being removed by stripping from the optical glass fiber substantially no residue left on the optical glass fiber, and (iv) which satisfies each of the following inequalities (I) and (II), $$X \leq 0.2 \text{ kg/mm}^2 \qquad (I)$$

$$X/Y \geq 1/10 \qquad (II)$$

wherein X is the tensile modulus (kg/mm$^2$) measured at 23° C. and Y is the tensile modulus (kg/mm$^2$) measured at −40° C.

This coating composition comprises:

(A) a urethane (meth)acrylate formed from,
  (a) a diol compound containing at least one structure represented by one of the following formulas (1) and (2),

(1)

(2)

(b) a compound containing two isocyanate groups, and
  (c) a compound containing a (meth)acrylate group and a hydroxy group;

(B) a second (meth)acrylate-containing compound of which the homopolymer has a glass transition temperature of at most about 0° C.; and (C) a polymerization initiator.

DETAILED DESCRIPTION OF PREFERRED EMBODIMENTS

The urethane (meth)acrylate (A) can be obtained by the reaction of a diol compound (a) comprising at least one of the structures represented by the formulas (1) and (2):

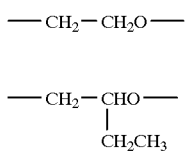

(1)

(2)

(hereinafter referred to as "diol compound (a)"), a compound containing two isocyanate groups (b), and a compound containing a (meth)acrylate group and a hydroxy group (c) (hereinafter referred to as "(meth)acrylate compound (c)"). The language "(meth)acrylate" as used herein includes acrylate, methacrylate, and mixtures thereof.

Preferably, the structure represented by the formula (1) in diol compound (a) is present in an amount of about 2 to about 50% by weight, and more preferably about 10 to about 40% by weight of the diol compound (a). These amounts of formula (1) produce a cured coating having well balanced oil resistance and water resistance.

Preferably, the structure represented by the formula (2) in diol compound (a) is present in an amount of about 20 to about 98% by weight, and more preferably about 60 to about 90% by weight based on the total weight of the diol compound (a).

Besides the structures represented by formulas (1) and (2), the diol compound (a) may contain structures represented by the following formulas (3-1) to (3-6) to the extent that objects of the present invention are not adversely affected.

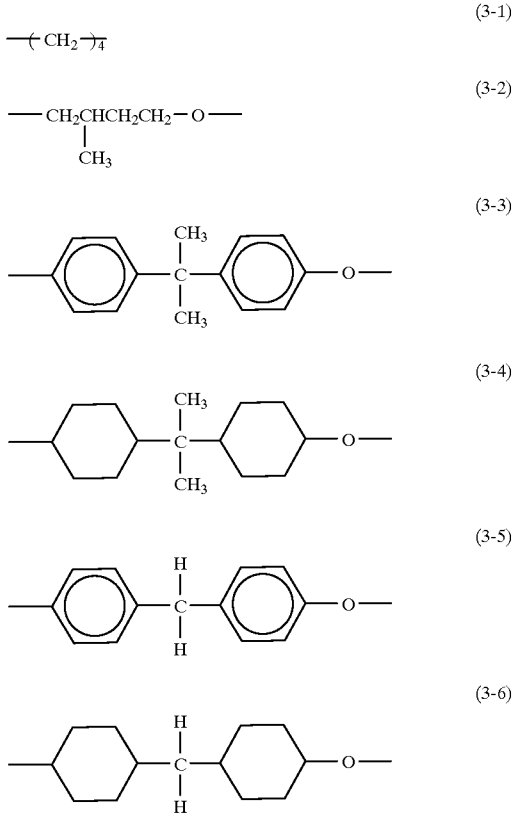

These structures are usually present in an amount of about 12% by weight or less in diol compound (a).

To provide excellent coatability when the coating composition is applied to optical glass fibers and to provide a suitable Young's modulus of elasticity of the cured coating, the number average molecular weight of the diol compound (a) is preferably about 200 to about 10,000, and more preferably about 1,000 to about 5,000.

Diol compound (a) can be prepared, for example, by the ring-opening copolymerization of ethylene oxide and 1,2-butene oxide. The ring-opening copolymerization of ethylene oxide and 1,2-butene oxide. The ring-opening copolymerization may be either random copolymerization or block copolymerization. The random copolymerization is preferred.

Other diols compounds, besides the diol compound (a), can also be used in combination with the diol compound (a). Examples of such diol compounds include polyether diols, polyester diols, polycarbonate diols, and polycaprolactone diols, which do not have the above formulas (1) and (2).

Examples of suitable polyether diols include, polyethylene glycol, 1,2-polypropylene glycol, polytetramethylene glycol, 1,2-polybutylene glycol, polyisobutylene glycol, ethylene oxide-tetrahydrofuran copolymer, methyltetrahydrofuran-tetrahydrofuran copolymer, and the like.

Examples of suitable polyester diols which can be used include polyester polyols obtained by the reaction of a polyhydric alcohol, such as, ethylene glycol, polyethylene glycol, propylene glycol, polypropylene glycol, tetramethylene glycol, polytetramethylene glycol, 1,6 hexane diol, neopentyl glycol, 1,4-cyclohexanedimethanol, 3-methyl-1, 5-pentane diol, 1,9-nonane diol, or 2-methyl-1,8-octane diol, and a polybasic acid, such as phthalic acid, isophtalic acid, terephtalic acid, maleic acid, fumaric acid, adipic acid, or sebacic acid. Commercially available products which can be used include Pole P-2010, P-3010, P-4010, P-5010, F-1010, F-2010, F-3010, PMIPA-2000, PKA-A, MPD/IPA, P-2011, MPD/TPA, L-2010, L-3010, A-1010, A-1510, A-2010, PNA-2000, PNOA-1010, and PNOA-2010, all manufactured by Kuraray Co.,Ltd.

Examples of suitable polycaprolactone diols that can be used are those obtained by the reaction of caprolactone and a diol, such as, ethylene glycol, polyethylene glycol, propylene glycol, polypropylene glycol, tetramethylene glycol, polytetramethylene glycol, 1,2-polybutylene glycol, 1,6-hexane diol, neopentyl glycol, 1,4 cyclohexanedimethanol, 1,4-butane diol, and commercially available polycaprolactone diols such as PLACSEL 204, 205AL, 212, 212AL, 220, and 220AL, all manufactured by Diacell Co., Ltd.

Diols other than the above-described diols that can be used include, ethylene glycol, propylene glycol, 1,4-butane glycol, 1,5-pentane glycol, 1,5-hexane glycol, neopentyl glycol, 1,4-cyclohexanedimethanol, dimethylol compounds of dicyclopentadiene, tricyclodecanedimethanol, polybutadiene with terminal hydroxy groups, hydrogenated polybutadiene having terminal hydroxy groups, polydimethylsiloxane compounds having terminal diols, and polydimethylsiloxane carbitol-denatured diols.

These diols compounds can be used either alone or in admixture of two or more with the diol compound (a).

The number average molecular weight of the diol compounds, other than diol compound (a), is usually about 200 to about 10,000, preferably about 200 to about 5,000, and they are incorporated in an amount of about 20% by weight or less based on the amount of urethane (meth) acrylate (A) produced.

Examples of suitable diisocyanate compounds (b) include, 2,4-tolylene diisocyanate, 2,6-tolylene diisocyanate, 1,3-xylylene diisocyanate, 1,4-xylylene diisocyanate, 1,5-naphthalene diisocyanate, m-phenylene diisocyanate, 3,3-dimethyl-4,4-phenylmethane diisocyanate, 4,4-diphenylmethane diisocyanate, 3,3-dimethylphenylene diisocyanate, 4,4-biphenylene diisocyanate, 1,6-hexane diisocyanate, isophorone diisocyanate, methylene bis(4 cyclohexylisocyanate), 2,2,4-trimethylhexamethylene diisocyanate, 1,4-hexamethylene diisocyanate, bis(2 isocyanate-ethyl) fumarate, 6-isopropyl-1,3-phenyl diisocyanate, 4-diphenylpropane diisocyanate, and lysine diisocyanate. More than one type of diisocyanate compound (b) can be used.

Examples of suitable (meth)acrylate compounds (c) include, 2-hydroxyethyl (meth)acrylate, 2-hydroxypropyl (meth)acrylate, 2-hydroxybutyl (meth)acrylate, 2-hydroxy 3-phenyloxypropyl (meth)acrylate, 1,4-butanediol mono (meth)acrylate, 2-hydroxyalkyl (meth)acryloyl phosphate, 4-hydroxycyclohexyl (meth)acrylate, 1,6-hexanediol mono (meth)acrylate, neopentylglycol mono(meth)acrylate, trimethylolpropane di(meth)acrylate, trimethylethane di(meth)acrylate, pentaerythritol tri(meth)acrylate, dipentaerythritol penta(meth)acrylate, and (meth)acrylates represented by the following formula (4)

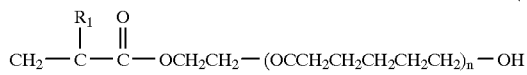

(4)

wherein $R_1$ is a hydrogen atom or a methyl group and n is an integer from 1 to about 15, preferably 1–4.

Compounds obtained by the addition reaction of a glycidyl group-containing compound, such as alkyl glycidyl ether, allyl glycidyl, ether, or glycidyl (meth)acrylate, and a (meth)acrylic acid can also be used.

The above described (meth)acrylate compounds (c) can be used either alone or in admixture of two or more of them Among these (meth)acrylate compounds (c), 2-hydroxyethyl (meth)acrylate and 2-hydroxypropyl (meth) acrylate are especially preferred.

The urethane (meth)acrylate (A) can be obtained by reacting the diol compound (a), the diisocyanate compound (b), the (meth)acrylate compound (c) and, optionally, diol compounds other than the diol compounds (a). Specifically, this reaction is between the isocyanate groups in the diisocyanate compound (b) and the hydroxy groups present in the diol compound (a), any other diol compounds if present, and the (meth)acrylate compound (c). This reaction can be carried out, for example, by the following methods (i)–(iv).

(i) The diol compound (a), any other diol compounds present, the diisocyanate compound (b), and the (meth) acrylate compound (c) are charged into a reactor and then reacted under suitable conditions which are known to one skilled in the art.

(ii) Diol compound (a), any other diol compound present, and the diisocyanate compound (b) are first reacted, and then the resulting reaction product is reacted with the (meth)acrylate compound (c).

(iii) Diisocyanate compound (b) and the (meth)acrylate compound (c) are first reacted, and then the resulting reaction product is reacted with the diol compound (a) and any other diol compounds present.

(iv) Diisocyanate compound (b) and a portion of the (meth)acrylate compound (c) are first reacted, the resulting product is reacted with all of the diol compound (a) and about 20 to about 80% by weight of any other diol compounds present, and the resulting reaction product is finally reacted with the remaining other diol compounds present and the remaining. (meth)acrylate compound (c).

The diol compound (a), diisocyanate compound (b) and (meth)acrylate compound (c) can be used in a proportion such that the amount of isocyanate groups contained in the diisocyanate compound (b) are about 1.1 to about 3 equivalent and the hydroxy group contained in the (meth)acrylate compound (c) is about 0.1 to about 1.5 equivalent, for one equivalent of the hydroxy group contained in the diol compound (a) an any other diol compounds present.

When a greater adhesion of the cured coating to the optical glass fiber is desired, it is possible to add, or replace a portion of (meth)acrylate compound (c) with, a silane-coupling agent having a functional group reactive with isocyanate. Examples of such silane coupling agents include, aminopropyltrimethoxysilane, aminopropyltriethoxysilane, mercaptopropylatrimethoxysilane, and mercaptopropyltriethoxysilane.

These silane coupling agents can be used in an amount such that the functional group reactive with isocyanate group contained in the silane coupling agents is about 0.05 to about 0.3 equivalent, preferably about 0.05 to about 0.15 equivalent, for one equivalent of the hydroxy group contained in the (meth)acrylate compound (c).

A catalyst can be used to catalyze the urethane polymerization reaction. Examples of suitable catalysts include, copper naphthenate, cobalt naphtenate, zinc naphtenate, di-butyl tin laurate, triethylamine, triethylenediamine, or 2-methyltriethylenediamine.

The catalyst can be present, for example, in an amount of about 0.01 to about 1 part by weight based on 100 parts by weight of the total amount of the reaction components. The reaction temperature, for example, can be about 10° C. to about 90° C., and preferably about 30° C. to about 80° C.

The number average molecular weight of urethane (meth) acrylate (A) thus obtained is preferably about 1,000 to about 20,000, and more preferably about 2,000 to about 15,000, in order to provide the optical glass fiber coating composition having a viscosity adequate for coating optical glass fibers, and to obtain cured coatings having a low tensile modulus which is stable over a broad range of temperatures below room temperature.

To obtain a cured coating having a good breaking extension, the urethane (meth)acrylate (A) thus obtained can be incorporated in the optical glass fiber coating composition in an amount of about 15 to about 70% by weight, based on the total weight of the coating composition. Use of the urethane (meth)acrylate (A) in range of about 20 to about 60% by weight is particularly preferred to provide an optical glass fiber coating composition having good coatability on optical glass fibers and a cured coating having excellent flexibility in combination with long-term reliability.

Examples of the compound containing a (meth)acrylate group (B) include, isobutyl acrylate, tridecyl acrylate, 2-ethylhexyl acrylate, lauryl acrylate, trioctyl acrylate, 2-methoxyethyl acrylate, 2-methoxybutyl acrylate, phenoxyethyl acrylate, phenol polyethylene glycol acrylate, nonylphenol polyethylene glycol acrylate, nonylphenol polypropylene glycol acrylate, 2-hydroxyethyl acrylate, 2-hydroxypropyl acrylate, tetrahydrofurfuryl acrylate, 2-acryloyloxyethyl succinate.

Preferably, the compound containing a (meth)acrylate group (B) includes (meth)acryl esters containing a high molecular weight mono-alcohol compound, obtained from a cyclic ether compound by ring-opening polymerization and then sealing the active end of the polymer obtained with an alcohol. The ring-opening polymerization can be accomplished, for example, by ionic polymerization.

Preferred examples of the cyclic ether include $C_2$–$C_5$ cyclic ethers, such as ethylene oxide, propylene oxide, butene oxide, tetrahydrofuran, 3-methyl tetrahydrofuran, and the like. These ethers can be used either alone or in admixture of two or more. $C_1$–$C_{12}$ alcohols, such as methanol, ethanol, propylalcohol, butanol, and the like, can be used as the alcohol for sealing the active end of the polymer.

The weight average molecular weight of the high molecular weight mono-alcohol compound thus obtained can be about 200 to about 10,000, and preferably about 500 to about 5,000. The use of the high molecular weight mono-alcohol compounds having a molecular weight in this range provides an optical glass fiber coating composition that can be easily handled and exhibits excellent coatability on optical glass fibers. Furthermore, when these compounds are used in the optical glass fiber coating composition and the coating composition is suitably cured, coatings having a low tensile modulus can be obtained.

Examples of suitable commercial products of the compound having a (meth)acrylate group (B) include AIB, LA, 2-MTA, BISCOAT #150, #158, #192 (Osaka Organic Chemical Industry, Ltd.), NP-4, NP8EA, L-A, PO-A, P-200A, HOA-MS (Kyoei Chemical Co., Ltd.), M101, M113, M114, M117 (Toagosei Chemical Industries), KAYARAD TC11OS (Nippon Kayaku Co., Ltd.), M3000-20A, M-3000-21A (Dai-ichi kogyo Seiyaku), and the like.

The above described compounds containing a (meth) acrylate group (B) may be used in combination of two or more. Preferred combinations include: a combination of lauryl acrylate and nonylphenol polyethylene glycol acrylate, a combination of nonylphenol polyethylene glycol acrylate having a polyethylene glycol chain having an average molecular weight of about 40 to about 300 and nonylphenol polyethylene glycol acrylate containing a polyethylene glycol chain having an average molecular weight of about 300 to about 1,000; a combination of an acryl ester containing a copolymer mono-alcohol produced from ethylene oxide and butene oxide and having a number average molecular weight of about 500 to about 5,000, as an alcohol component, and lauryl acrylate; a combination of an acryl ester containing a copolymer mono-alcohol produced from ethylene oxide and butene oxide and having a number average molecular weight of about 500 to about 5,000, as an alcohol component, and nonylphenol polyethylene glycol acrylate; and the like. These combinations provide cured coatings having a low Young's modulus of elasticity in combination with a minimal increase in the Young's modulus of elasticity at low temperatures.

The amount of compound containing a (meth)acrylate group (B) in the optical glass fiber coating composition of the present invention is preferably about 10 to about 70% by weight, and more preferably about 20 to about 60% by weight of the total weight of the optical glass fiber coating composition. The addition of the compound containing a (meth)acrylate group (B) in this range provides a cured coating having a tensile modulus which is low at room temperature and stable over a broad range of temperatures below room temperature, containing only a slight amount of uncured material, and exhibiting excellent long-term reliability. In addition, the cured coatings exhibit adequate adhesion to glass optical fibers and yet are strippable from the glass optical fibers. In particular, substantially no residues remain on optical glass fibers when the coatings are stripped from the surface of the optical glass fibers.

Polymerization diluents can optionally be included in the composition of the present invention. Compounds having at least one (meth)acryloyl group or vinyl group which are liquid or solid at room temperature can be used as polymerization diluents. Included in these compounds are monofunctional compounds having one (meth)acryloyl group or vinyl group and polyfunctional compounds having two or more of these groups. Both the monofunctional compounds and polyfunctional compounds can be used together in the present invention. The use of a monofunctional compound having at least one (meth)acryloyl group or at least one vinyl group is especially preferred.

Examples of monofunctional compounds having one (meth)acryloyl group include: t-butyl (meth)acrylate, stearyl (meth)acrylate, 2-hydroxy-3-phenoxypropyl (meth)acrylate, butoxyethyl (meth)acrylate, ethoxydiethylene glycol (meth) acrylate, cyclohexyl (meth)acrylate, dicyclopentadienyl (meth)acrylate, dicylcopentanyl (meth)acrylate, dicyclopentenyl (meth)acrylate, tricyclodecanyl (meth)acrylate, isobornyl (meth)acrylate, bornyl (meth)acrylate, diacetone (meth)acrylamide, isobutoxymethyl (meth)acrylamide, N,N-dimethyl (meth)acrylamide, t-octyl (meth)acrylamide, dimethylaminoethyl (meth)acrylate, diethylaminoethyl (meth)acrylate, and 7-amino-3,7-dimethyloctyl (meth) acrylate. Examples of commercial products ARONIX M111, M5600, M5700 (Toagosei Chemical Industry Co., Ltd.), KAYARAD R629, R644 (Nippon Kayaku Co., Ltd.), BISCOAT #155, #3700, IBXA (Osaka Organic Chemical Industry, Ltd.), and the like.

Examples of polyfunctional compounds having two or more (meth)acryloyl groups include: trimethylolpropane tri (meth)acrylate, pentaerythritol tri(meth)acrylate, ethylene glycol di(meth)acrylate, tetraethylene di(meth)acrylate, 1,4-butanediol di(meth)acrylate, 1,6 hexanediol di(meth) acrylate, neopentyl glycol (meth)acrylate, trimethylolpropanetrioxyethyl (meth)acrylate, tris(2-hydroxyethyl) isocyanurate di(meth)acrylate, tricyclodecanedimethanol di(meth)acrylate, and epoxy (meth)acrylate which is an addition compound of (meth)acrylate to bisphenol A glycidyl ether.

Commercially available products include UPIMER-W, SA1002, SA2007 (Mitsubishi Petrochemical Co., Ltd.), BISCOAT #700 (Osaka Organic Chemical Industry Ltd.), KAYARAD R-604, DPCA-20, DPCA-30, DPCA-60, DPCA-120, HX-620, D-310, D-330, (Nippon Kayaku Co., Ltd.), ARONIX M210, M215, M315, M325 (Toagosei Chemical Industry Co., Ltd.), and the like.

The molecular weight of the diluents having (meth) acryloyl groups is typically about 200 to about 3,000.

Examples of diluents having vinyl groups include: N-vinylpyrrolidone, N-vinylcaprolactum, hydroxybutyl vinyl ether, lauryl vinyl ether, cetyl vinyl ether, 2-ethylhexyl vinyl ether, and triethylene glycol divinyl ether. Of these N-vinylpyrrolidone and N-vinylcaprolactum are especially preferred compounds because they promote curing of the optical glass fiber coating composition and adhesion of the cured coating to optical glass fibers.

The polymerization diluents can be incorporated in the optical glass fiber coating composition of the present invention in an amount of 0 to amount 40%, preferably about 1 to about 20%, based on the total weight of the coating composition. An excessive amount of the polymerization diluent present in the optical glass fiber coating composition may undesirably increase the tensile modulus of the cured coating at low temperatures and undesirably increase attenuation of the signal transmission when coated on optical glass fibers.

The optical glass fiber coating composition of the present invention can be cured by heat and/or radiation. Examples of radiation include infrared light, visible light, ultraviolet light, X-rays, electron beam, α-rays, β-rays, and γ-rays.

When the optical glass fiber coating composition of the present invention is cured by heat, a common radical polymerization initiator can be used. Example of radical polymerization initiators include peroxides and azo compounds. Specific examples include benzoyl peroxide, t-butyloxybenzoate, azobisisobutyronitrile, and the like.

When the optical glass fiber coating composition is cured using visible light, ultraviolet light, or the like, a photoinitiator and, optionally, a photosensitizer can be used as polymerization initiators. Examples of suitable photoinitiators include: 1-hydroxycyclohexyl phenyl ketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4-dimethoxybenzophenone, 4,4-diaminobenzophenone, Michler's ketone, benzoin propyl ether, benzoin ethyl ether, benzyl dimethyl ketal, 1-(4-isopropylphenyl)2-hydroxy-2-methylpropane-1-one, 2-hydroxy-2-methyl-1-phenylpropane-1-one, thioxanthone, diethylthioxanthone, 2-isopropylthioxanthone, 2-chlorothioxanthone, 2-methyl-1 (4-(methylthio)phenyl)-2-morpholinopropane-1-one, and 2,4,6-trimethylbenzoyldiphenylphosphine oxide. Commercially available examples include IRGACURE 184, 651, 500 907, CG1369, CGI-1700 (Ciba Geigy); Lucirin LR8728 (BASF), Darocur 1116, 1173 (Merck Co.); and Ubecryl P36 (UCB Co.).

Preferably, these polymerization initiators can be incorporated in the optical glass fiber coating composition in an amount of about 0.1 to about 10% by weight of the total coating composition.

Examples of suitable photosensitizers include: triethylamine, diethylamine, N-methyldiethanolamine, ethanolamine, 4-dimethylaminobenzoic acid, ethyl 4 dimethylaminobenzoate, isoamyl 4-dimethylaminobenzoate, and commercially available products such as Ubecryl P102, P103, P104, a P105 manufactured by UCB Co. These photosensitizers can be used in an amount of less than about 5% by weight.

Beside the above components, the optical glass fiber coating composition may be formulated with various components, as required, such as antioxidants, absorbers, photostabilizers, silane coupling agents, thermal polymerization inhibitors, leveling agents, surface active agents, preservatives, plasticizers, lubricants, solvents, fillers, coloring matters, wettability improvers, and coating surface improvers. Use of these components is well known to those skilled in the art.

Examples of suitable commercially available antioxidants include Irganox 1010, 103, 1076, 1222 (manufactured by Ciba Geigy), and the like. As W absorbers Tinuvin P, 234, 320, 326, 327, 328, 213 (manufactured by Ciba Geigy) Sumisorb 100, 130, 140, 220, 250, 300, 320, 340, 350, 400 (manufactured by Sumitomo Chemical Industries Co., Ltd.), and the like can be used. Commercially available photostabilizers which can be added include Tinuvin 292, 144, 622LD (manufactured by Ciba Geigy), and Sanol LS700, LS765, LS292, LS2626, LS1114, LS744 (manufactured by Sankyo Chemical Co.). Examples of suitable silane coupling agent include: epoxy resin, polyamide, polyamideimide, polyurethane, polybutadiene, chloroprene, polyether, polyester, pentadiene derivatives, styrene/butadiene/styrene block copolymer, styrene/ethylene/butene/styrene block copolymer, styrene/isoprene/styrene block copolymer, petroleum resin, xylene resin, ketone resin, fluorine-containing oligomer, silicone oligomer, polysulfide oligomer, and the like.

The optical glass fiber coating composition can be prepared by blending the components using any common or well-known method. The viscosity of the composition thus prepared is typically about 100 to about 20,000 cps at 25° C., and preferably about 1,500 to about 15,000 cps at 25° C. to facilitate application of the coating composition to optical glass fibers.

When suitably cured by heat or radiation, the optical glass fiber coating composition provides a cured coating which satisfies the following inequalities (I) and (II), $$X \leq 0.2 \text{ kg/mm}^2 \qquad (I)$$

$$X/Y \geq 1/10 \qquad (II)$$

wherein X is the tensile modulus (kg/mm$^2$) measured at 23° C. and Y is the tensile modulus (kg/mm$^2$) measured at −40° C.

If the tensile modulus X at 23° C. of the cured coating is 0.2 kg/mm$^2$ or less, one of the well-known causes for an undesired increase in the attenuation of the signal transmission when the coating is used as the primary coating on optical glass fibers is substantially eliminated.

Further, the ratio XSY, (the ratio of the tensile modulus at 23° C. ad the tensile modulus at −40° C. of the cured product) of about 1/10 or larger indicates a stable tensile modulus at low temperatures and that one of the known causes for the undesired increase in the attenuation of the signal transmission is substantially eliminated.

Preferably, the tensile modulus X at 23° C. is in the range of about 0.02 to about 0.18 kg/mm$^2$, and the ratio of the tensile modulus X at 23° C. and the tensile modulus Y at −40° C. (X/Y) is about 1/5 or larger, most preferably about 1/2.5 or larger.

One skilled in the art reading and comprehending this disclosure will be able to adjust the types of raw materials, their amounts, and curing conditions, without undue experimentation, to achieve cured coatings which satisfy the above inequalities (I) and (II). The factors affecting the tensile modulus of the cured coating include the type and amounts of diol compounds (a), diisocyanate compounds (b), (meth)acrylate compounds (c), and other optional components used for preparing the urethane (meth)acrylate (A); the types and amounts of (meth)acrylate compounds (d); the types and amounts of other optional components used for preparing the composition of the present invention; the types and amounts of polymerization initiators; and the curing conditions, such as curing temperature and types of radiation.

EXAMPLES

The present invention will be further explained with reference to the following non-limiting examples. In the examples below "parts" means "parts by weight".

Synthesis of Urethane Acrylate UA-1

To a reaction vessel equipped with a stirrer were charged 5.95 parts of tolylene diisocyanate, 91.30 parts of a copolymer diol of ethylene oxide and butene oxide having a number average molecular weight of 4,000 (which contains 30 wt % of the structure (1) and 70 wt % of the structure (2)), and 0.02 part of 2,6-di-tert-butyl-p-cresole, as a polymerization inhibitor. The mixture was cooled using ice to 10° C. or below while stirring. 0.08 part of dibutyltin dilaurate was added when the temperature was decreased to 10° C. or below, and the mixture was stirred for 2 hours while controlling the temperature at 20–30° C., whereupon 2.65 parts of hydroxyethyl acrylate was added, followed by stirring for 4 hours at 50–60° C. The reaction was terminated when the residual isocyanate was reduced to 0.1 wt % or less. The urethane acrylate polymer thus obtained is designated as UA-1.

Synthesis of Urethane Acrylate UA-2

To a reaction vessel equipped with a stirrer were charged 5.95 parts of tolylene diisocyanate, 91.30 parts of a copolymer diol of polyethylene oxide and butene oxide having a number average molecular weight of 4,000 (which contains 20 wt % of the structure (1) and 80 wt % of the structure (2)), and 0.02 part of 2,6-di-tert-butyl-p-cresole, as a polymerization inhibitors The mixture was cooled using ice to 10° C. or below while stirring. 0.08 part of dibutyltin dilaurate was added when the temperature was decreased to 10° C. or below, and the mixture was stirred for 2 hours while controlling the temperature at 20–30° C., whereupon 2.65 parts of hydroxyethyl acrylate was added, followed by stirring for 4 hours at 50–60° C. The reaction was terminated when the residual isocyanate was reduced to 0.1 wt % or less. The urethane acrylate polymer thus obtained is designated as UA-2.

Synthesis of Urethane Acrylate UA-3

To a reaction vessel equipped with a stirrer were charged 5.95 parts of tolylene diisocyanate, 91.30 parts of a copolymer diol of ethylene oxide and butene oxide having a number average molecular weight of 4,000 (which contains 30 wt % of the structure (1) and 70 wt % of the structure (2)), and 0.02 part of 2,6-di-tert-butyl-p-cresole, as a polymerization inhibitor. The mixture was cooled using ice to 10° C. or below while stirring. 0.08 part of dibutyltin dilaurate was added when the temperature was decreased to 10° C. or below, and the mixture was stirred for 2 hours while controlling the temperature at 20–30° C., whereupon 0.5 parts of -methacryloxypropyltrimethoxysilane and 2.65 parts of hydroxyethyl acrylate were added, followed by stirring for 4 hours at 50–60° C. The reaction was terminated when the residual isocyanate was reduced to 0.1 wt % or less. The urethane acrylate polymer thus obtained is designated as UA-3.

Examples 1–6 and Comparative Examples 1–2

The components shown in Table 1 were each charged to a reaction vessel equipped with a stirrer for 3 hours while controlling the temperature at 50–60° C. to make coating compositions.

The chemical structures of nonylphenol polyethylene (n=4) glycol acrylate, nonylphenol polyethylene (n=7) glycol acrylate, M-3000-21A, Lucirin, and CGI-1700 in Table 1 are as follows. Nonylphenol polyethylene (n=4) glycol acrylate Nonylphenol Polyethylene (n=4) Glycol Acrylate

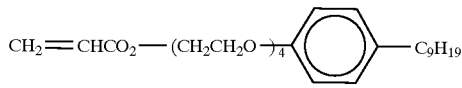

Nonylphenol Polyethylene (n=7) Glycol Acrylate

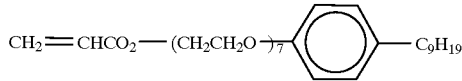

M-3000-21a

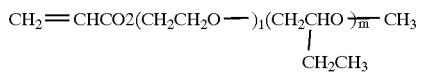

wherein $1/m=0.6-0.8$ and $1+m=45-55$

Lucirin

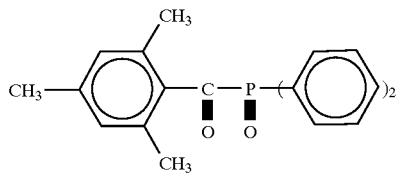

CGI-1700

A 25:75 (by weight) mixture of,

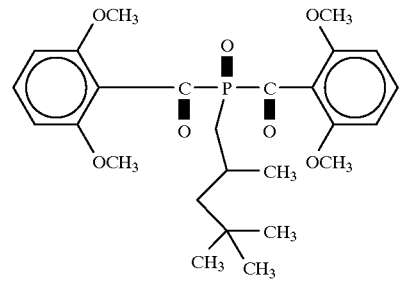

and

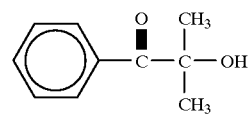

TABLE 1

| Evaluation Item | Examples | | | | | | Comparative Examples | |
|---|---|---|---|---|---|---|---|---|
|  | 1 | 2 | 3 | 4 | 5 | 6 | 1 | 2 |
| (A) Urethane (meth)acrylate | | | | | | | | |
| UA-1 | 50.0 | — | — | — | 50.0 | 50.0 | 50.0 | — |
| UA-2 | — | 50.0 | — | — | — | — | — | — |

TABLE 1-continued

|  | Examples | | | | | | Comparative Examples | |
| --- | --- | --- | --- | --- | --- | --- | --- | --- |
| Evaluation Item | 1 | 2 | 3 | 4 | 5 | 6 | 1 | 2 |
| UA-3 | — | — | 50.0 | 50.0 | — | — | — | 50.0 |
| (B) (meth)acrylate compound (d) | | | | | | | | |
| Nonylphenyl polyethylene (n = 4) glycol acrylate | 21.5 | — | 21.3 | — | — | 21.3 | 11.3 | — |
| Nonylphenyl polyethylene (n = 7) glycol acrylate | — | 21.3 | 20.0 | 21.3 | — | — | — | 11.3 |
| Lauryl acrylate | 20.0 | 20.0 | — | 20.0 | — | — | — | — |
| M-3000-21A | — | — | — | — | 48.5 | 27.2 | — | — |
| Polymerizable diluent | | | | | | | | |
| N-vinyl-2-caprolactum | 7.0 | 7.0 | 7.0 | 7.0 | — | — | 7.0 | 7.0 |
| Isobornylacrylate | — | — | — | — | — | — | 30.0 | 30.0 |
| (C) Polymerization initiator | | | | | | | | |
| Lucirin | 1.5 | 1.5 | 1.5 | — | 1.5 | 1.5 | 1.5 | 1.5 |
| CGI-1700 | — | — | — | 1.5 | — | — | — | — |

The compositions shown in Table 1 were applied to glass plates using a 150 μm applicator and then irradiated with ultraviolet light at 1.0 J/cm² in air to produce cured films. The cured films were peeled from the glass plates and conditioned at 23° C. and 50% RH for 24 hours to obtain test specimens.

The tensile modulus, adhesion strength, and peelability of the cured coatings were measured using the following methods.

(1) Tensile Modulus

The tensile modulus at 23° C. was measured according to JIS K7113. The drawing rate was 1 mm/min and the tensile modulus was calculated from the tensile stress at 2.58 strain.

The tensile modulus at −40° C. was also measured according to JIS7113. The drawing rate van 1 mm/min and the tensile modulus was calculated from the tensile stress at 25% strain.

The test results and the ratio of the tensile modulus at 23° C. and −40° C. (X/Y) are shown in Table 2.

(2) Adhesion Strength

The resin compositions were applied to quartz plates using an applicator having a thickness of 150 μm and irradiated with ultraviolet light at 0.1 J/cm² under a nitrogen atmosphere to produce cured films. The cured films were cut to a width of 1 cm.

The cured films were pulled at a right angle to the quartz plates and peeled away from the quartz plates at a rate of 50 mm/min, while measuring the force.

(3) Peelability Test

The coating compositions were applied to quartz plate using an applicator having a thickness of 150 μm and then irradiated with ultraviolet rays at 0.1 J/cm² under a nitrogen atmosphere to produce cured films.

The cured films were pulled at an angle of 180° from the quartz plates to peel them away from the quartz plates at a rate of 50 mm/min. The peelability was evaluated by observation the samples using the naked eye and touching the samples with the finger to examine the presence or absence of residues of the film on the quartz plates. If neither observation confirmed any residues remaining on the quartz plates, the peelability was judged as good; if any residues were confirmed by either observation, the peelability was judged as bad. The results are shown in Table 2.

TABLE 2

|  | Examples | | | | | | Comparative Examples | |
| --- | --- | --- | --- | --- | --- | --- | --- | --- |
|  | 1 | 2 | 3 | 4 | 5 | 6 | 1 | 2 |
| Tensile modulus (kg/mm²) | | | | | | | | |
| at 23° C. (X) | 0.07 | 0.06 | 0.07 | 0.06 | 0.08 | 0.06 | 0.07 | 0.06 |
| at − 40° C. (Y) | 0.15 | 0.10 | 0.25 | 0.13 | 0.13 | 0.13 | 5.8 | 6.2 |
| X/Y | 1/2 | 1/2 | 1/4 | 1/2 | 1/2 | 1/2 | 1/83 | 1/103 |
| Adhesion strength (g/cm²) | 16 | 18 | 24 | 24 | 15 | 15 | 74 | 82 |
| Peelability | Good | Good | Good | Good | Good | Good | Bad | Bad |

The test results in Table 2 demonstrate that the optical glass fiber coating compositions according to the present invention can be suitably cured to provide coatings having a tensile modulus which is low at room temperature and stable over a broad range of temperatures below room temperature. The results also demonstrate that when the coating is used on optical glass fibers, adequate adhesion to the optical glass fiber achieved in combination with a good peelability from the optical glass fiber while not leaving residue on the optical glass fiber.

Therefore, the optical glass fiber coating composition of the present invention is an ideal material for use as a primary coating on optical glass fibers in which the tensile modulus must be low and stable over a wide temperature range.

Among the optical glass fiber coating compositions described herein, the following compositions are especially preferred embodiments:

An optical glass fiber coating composition containing, as (meth)acrylate compound (d), a (meth)acryl ester containing a mono-alcohol having a number average molecular weight of about 200 to about 10,000 and obtained from a $C_2$–$C_5$ cyclic ether compound by ring-opening polymerization and capping the active end of the polymer with a $C_1$–$C_{12}$ alcohol.

An optical glass fiber coating composition containing, as (meth)acrylate compound (d), a combination of lauryl acrylate and nonylphenol polyethylene glycol acrylate; a combination of nonylphenol polyethylene glycol acrylate having a polyethylene glycol chain having a number average molecular weight of about 40 to about 300 and nonylphenol polyethylene glycol acrylate having a polyethylene glycol chain having a number average molecular weight of about 300 to about 1,000; a combination of an acryl ester containing a copolymer mono-alcohol produced from ethylene oxide and butene oxide and having a number average molecular weight of about 500 to about 5,000, as an alcohol component, and lauryl acrylate; or a combination of an acryl ester containing a copolymer mono-alcohol produced from ethylene oxide and butene oxide and having a number average molecular weight of about 500 to about 5,000, as an alcohol component, and nonylphenol-polyethylene glycol acrylate.

While the claimed invention has been explained detail and with reference to specific embodiments thereof, it will be apparent to one of ordinary skill in the art that various changes and modifications can be made therein without departing from the spirit and scope of the claimed invention.

We claim:

1. A coated optical glass fiber having a coating exhibiting the combination of properties (i) through (iv)
    (i) a stable tensile modulus that is low at room temperature and over a broad range of temperatures below room temperature,
    (ii) an adhesion to the optical glass fiber sufficient to prevent structural defects and microbending in the optical glass fiber,
    (iii) the capability of being removed by stripping from the optical glass fiber substantially no residue left on the optical glass fiber, and
    (iv) which satisfies each of the following inequalities (I) and (II), $$X \leq 0.2 \text{ kg/mm}^2 \qquad (I)$$

$$X/Y \geq 1/10 \qquad (II)$$

wherein X is the tensile modulus (kg/mm²) measured at 23° C. and Y is the tensile modulus (kg/mm²) measured at −40° C., said coating comprising:
    (A) a urethane (meth)acrylate formed from,
        (a) a diol compound containing structures represented by the following formulas (1) and (2),

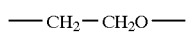

(1)

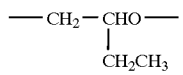

(2)

(b) a compound containing two isocyanate groups, and
        (c) a compound containing a (meth)acrylate group and a hydroxy group;
    (B) a second (meth)acrylate-containing compound of which the homopolymer has a glass transition temperature of at most about 0° C.; and
    (C) a polymerization initiator.

2. The coated optical glass fiber according to claim 1, wherein X/Y≧1/5 in formula (II).

3. The coated optical glass fiber according to claim 1, wherein said diol compound (a) comprises about 2 to about 50% by weight of said structure represented by formula (1) and about 20 to about 98% by weight of said structure represented by formula (2).

4. The coated optical glass fiber according to claim 1, wherein said diol compound (a) comprises about 10 to about 40% by weight of said structure represented by formula (1) and about 60 to about 90% by weight of said structure represented by formula (2).

5. The coated optical glass fiber according to claim 1, wherein said diol compound (a) has a number average molecular weight of about 200 to about 10,000.

6. The coated optical glass fiber according to claim 1, wherein said diol compound (a) is prepared by the ring-opening copolymerization of ethylene oxide and 1,2-butylene oxide.

7. The coated optical glass fiber according to claim 1, further comprising a second diol compound selected from the group consisting of polyether diols, polyester diols, polycarbonate diols, and polycaprolactone diols.

8. The coated optical glass fiber according to claim 1, wherein said compound containing a (meth)acrylate group and a hydroxy group (c) is formed by the addition reaction of a glycidyl group-containing compound, and a (meth) acrylic acid.

9. The coated optical glass fiber according to claim 1, further comprising a silane coupling agent to increase adhesion of the cured coating to the optical glass fiber.

* * * * *